(12) United States Patent
Kropac et al.

(10) Patent No.: US 7,686,497 B2
(45) Date of Patent: Mar. 30, 2010

(54) VARIABLE PLANAR LIGHT GUIDE MODULE

(75) Inventors: Miroslav Kropac, okr.Hodonin (CZ); Jan Martoch, Hranice (CZ)

(73) Assignee: Visteon Global Technologies, Inc., Van Buren Township, MI (US)

( * ) Notice: Subject to any disclaimer, the term of this patent is extended or adjusted under 35 U.S.C. 154(b) by 96 days.

(21) Appl. No.: 11/748,773

(22) Filed: May 15, 2007

(65) Prior Publication Data

US 2008/0002427 A1 Jan. 3, 2008

(30) Foreign Application Priority Data

May 15, 2006 (CZ) .................................. 2006-311

(51) Int. Cl.
*F21V 7/04* (2006.01)
(52) U.S. Cl. ................... 362/626; 362/606; 362/608; 362/613; 362/623
(58) Field of Classification Search ................. 362/600, 362/606, 608–613, 623, 626
See application file for complete search history.

(56) References Cited

U.S. PATENT DOCUMENTS

| | | | |
|---|---|---|---|
| 4,389,698 A | | 6/1983 | Cibie |
| 5,719,649 A | * | 2/1998 | Shono et al. ................... 349/65 |
| 5,984,497 A | | 11/1999 | Foerstner et al. |
| 6,808,281 B2 | * | 10/2004 | Ho .............................. 362/600 |
| 6,854,857 B2 | * | 2/2005 | Hara et al. .................... 362/613 |
| 2004/0085751 A1 | * | 5/2004 | Okuwaki et al. ............... 362/31 |
| 2005/0276565 A1 | * | 12/2005 | Bourdin et al. ............. 385/146 |

FOREIGN PATENT DOCUMENTS

JP          2000003607          7/2000

* cited by examiner

*Primary Examiner*—Sandra L O'Shea
*Assistant Examiner*—Meghan K Dunwiddie
(74) *Attorney, Agent, or Firm*—Brinks Hofer Gilson & Lione (57) ABSTRACT

A light guide and module for motor vehicles that directs light generally along a horizontal axis. The module includes an array of light sources, an array of reflectors and a light guide. The light guide defines a body having opposed upper and lower walls. Formed in the lower wall is at least one prismatic structure having a reflecting surface oriented to reflect light based the principle of total internal reflection and to redirect light toward the upper wall. Formed in the upper wall is at least one decoupling prism element. The decoupling prism elements corresponding in number to the prismatic structures and are located in the upper wall so as to receive redirected light from its corresponding prismatic structures. The decoupling prism element includes a second reflecting surface that reflects light redirected from the first reflecting surface. This second reflecting surface reflects light toward an output surface of the decoupling prism element based on the principle of total internal reflection and defines a vertical spread of light. With the present invention, light emitted from the output surface of the decoupling prism element can be directed generally along the horizontal axis when the upper surface is oriented significantly less than 90° relative to the horizontal axis.

21 Claims, 7 Drawing Sheets

VARIABLE PLANAR LIGHT GUIDE MODULE

BACKGROUND

1. Technical Field

The present invention relates to a variable planar light guide module (VPLG). More particularly, the invention relates to a VPLG designed for motor vehicles and intended to be placed on both sides of the vehicle.

2. Prior Art

A light guide or planar light guide works on the principle of total internal reflection. Current light guides are usually placed in the lamp assembly so that most of the light guide's decoupling surface is perpendicular to the intended direction of the decoupled light rays, which is parallel to the longitudinal axis of the vehicle. When incorporated into an automobile, lamps of this type become very attractive and create a unique appearance.

Light guide techniques are based on the total internal reflection (TIR) principle, which is caused by two materials with different refractive indices.

Figure 1:
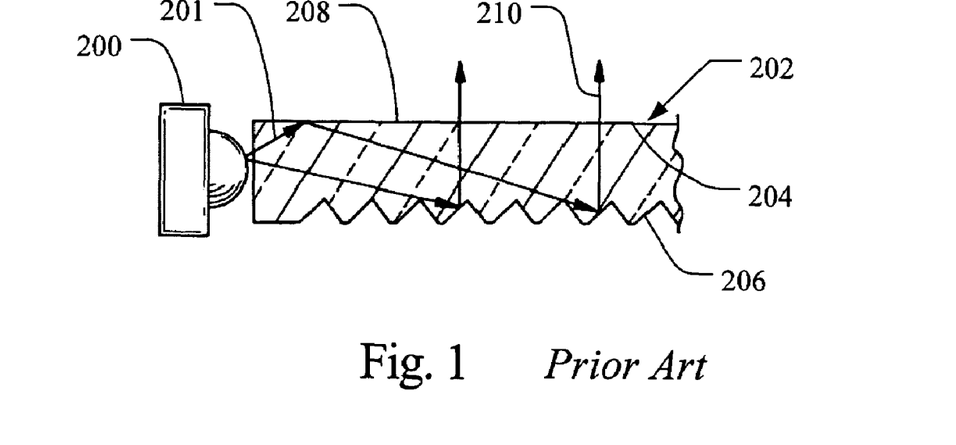
FIG. 1 shows a schematic of the principle of decoupling light in a light pipe or guide according to the known technology.

According to known technology, as seen in FIG. 1, coupled light 201 from a light source 200 goes through a translucent light guide 202 by TIR, which occurs on the smooth inner wall 204 of the light guide 202. To decouple the light from the light guide 202, prismatic structures 206 are placed on one side of the light guide 202. The prismatic structures 206 change the direction of impacted rays. The prismatic structure 206 defines the direction of decoupled light and must be designed so that, for impacted rays, the condition of TIR is fulfilled. Upon contact with the prismatic structures 206, the direction of these impacted rays is changed and the rays are reflected to the output wall 208 of the light guide 202, where the condition for TIR is not fulfilled. Thus, the rays 201 leave the light guide 202 through the output wall 208 as decoupled light rays 210.

The described optical system works with a good efficiency only in the situation where the output wall 208 of the light guide 202 is perpendicular to the decoupled light 210. In use with an automotive vehicle, the main direction of decoupled light is given by the lighting function represented by the light guide. Therefore, the output wall 208 of the light guide 202 must typically be perpendicular to the direction of the longitudinal axis of the vehicle. The efficiency of the decoupled light being emitted in this desired direction rapidly drops with the changes in the angle $\beta$ from perpendicular, between the output wall 208 of the light guide 202 and longitudinal axis X of the vehicle. The reason for this drop in efficiency is that impact of the coupled light rays with the prismatic structure does not occur via TIR reflection, but rather with Fresnel reflection, and therefore has a very low efficiency of reflection.

Figure 2A:
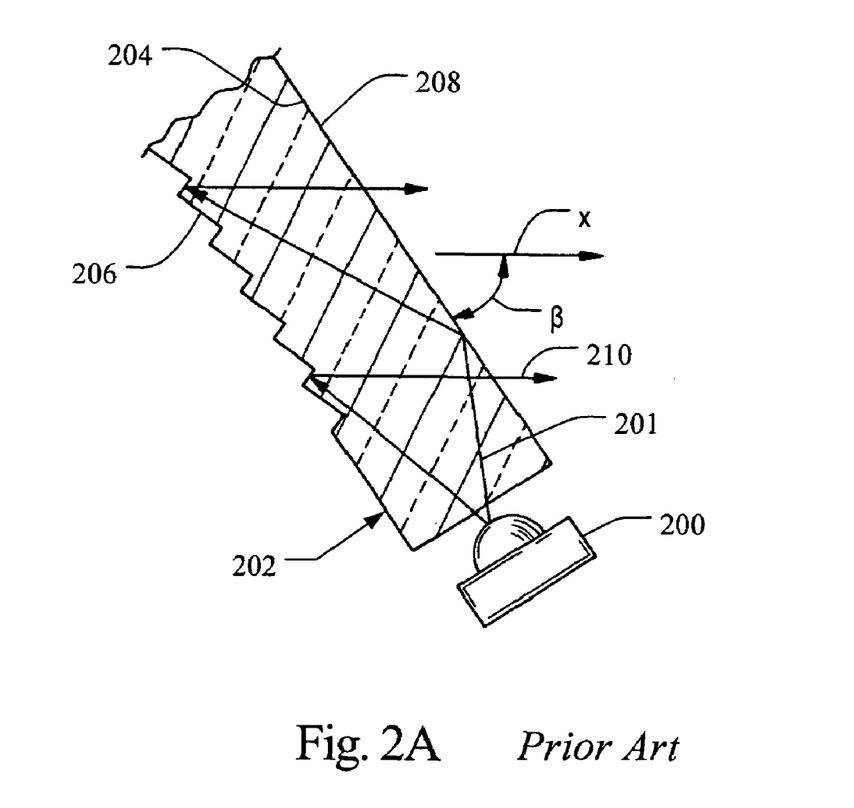
FIG. 2a is a schematic view of an inclined light guide according to the known technology.
Figure 2B:
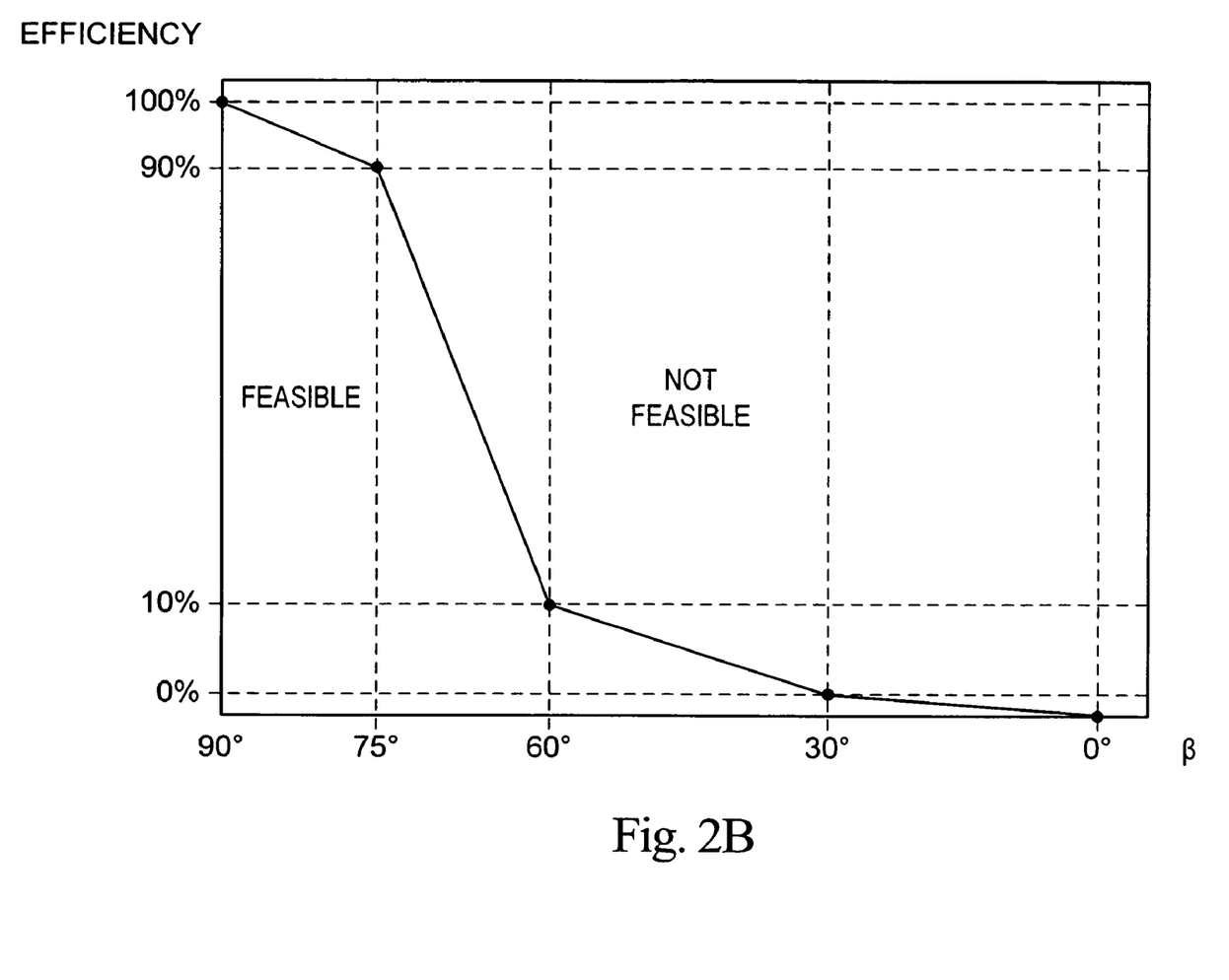
FIG. 2b is a plot of the drop in efficiency of decoupled light to the requested direction relative to β angle.

In the case of TIR reflection, 100% of the light is reflected to the output wall of the light guide. In the case of Fresnel reflection, only approximately 5%-20% of the light is reflected to the output wall. The shape of the prismatic structure gives the precise percentage of Fresnel reflection. FIG. 2 illustrates the situation where the light guide 202 is not perpendicular to the longitudinal axis X of the vehicle. FIG. 3 is a graph showing the drop in efficiency relative to a changing $\beta$ angle from perpendicular.

Using current planar light guide technology means that the efficiency of whole optical system will be very low and not able to fulfill legal requirements for a rear position light of an automotive vehicle because such rear lamps are not typically oriented perpendicular to the longitudinal axis of the vehicle.

It is therefore an object of the present invention to provide improved optical efficiency of the decoupled light from a light guide allowing inclined lamps to send light in a requested direction, generally parallel to the longitudinal axis of the vehicle.

SUMMARY

The proposed variable planar light guide provides a design that allows it to be placed in any orientation in the lamp, not just perpendicular to the intended direction of decoupled light. In doing this, the present invention uses optics on both sides of the light guide to send decoupled light from the light guide to the requested direction, as defined by the lighting function represented by the light guide.

The variable planar light guide module of the present invention is designed particularly for use as a signal lamp of a motor vehicle. Such signal lamps include, without limitation, turn, brake, backup, parking, hazard and other lamps. According to the light source color, the unit can be used as a front position light—white color, a rear position light—red color, and a side marker—red or amber color. The optical system of this light module includes a molded element (the planar light guide), an array of reflectors, and an array of light sources. As used herein, the term "variable" means that the construction of the planar light guide allows for placement of the planar light guide in substantially any plane in the lamp while still being able to send decoupled light in the intended direction. In achieving this, the decoupling elements are used on both walls of the planar light guide.

The proposed planar light guide according to this invention is principally intended for use in a very inclined rear lamp, approximately $\beta=40°$ for the angle between the longitudinal axis of the vehicle and the upper surface of the light guide, as rear position light.

In accordance with the present invention, a variable planar light guide module is placed on both sides of the motor vehicle. These modules include a planar light guide with a prismatic structure on the bottom wall of the planar light guide (which uses the principle of TIR to change the direction of the light traveling through the planar light guide and redirect it toward an upper wall of the planar light guide). The prismatic element, a decoupling prism element, sends the light in the direction of the longitudinal axis of the vehicle. The reflection of light on the decoupling prism surface works on the principle of TIR.

The planar light guide is fed by small compact array of reflectors with light sources. Advantageously, each reflector has one central facet and between at least two edge or side facets. The horizontal spread of the central facet is higher than horizontal spread of the edge facets. Collectively, the reflectors create a reflector array module.

In a preferred embodiment according to the present invention, light emitting diodes (LEDs) are used as the light source for said lighting module.

BRIEF DESCRIPTION OF THE DRAWINGS

These, as well as other objects and advantages of this invention, will be more completely understood and appreciated by careful study of the following detailed description of the exemplary embodiments, taken in conjunction with the accompanying drawings, in which.

DETAILED DESCRIPTION

Figure 3A:
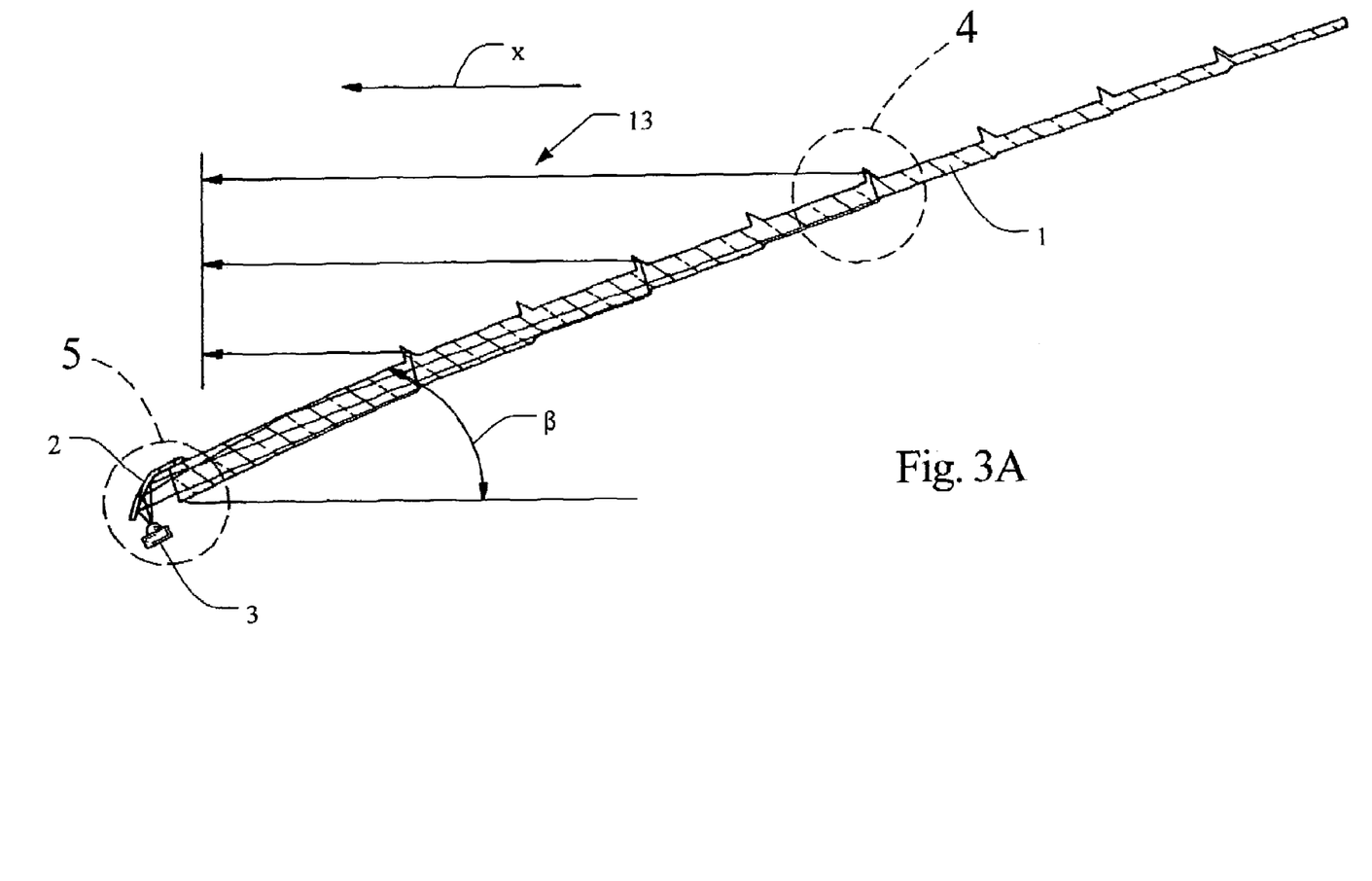
FIG. 3a is a horizontal section of a variable planar light guide module embodying the principles of the present invention.

A module incorporating the principles of the present invention is illustrated in FIG. 3a and includes a variable planar light guide 1, which is the main element of the module, an array of small compact reflectors 2 and an array of light sources 3. The number of light sources 3 corresponds with the number of the coupling compact reflectors 2.

Figure 5:
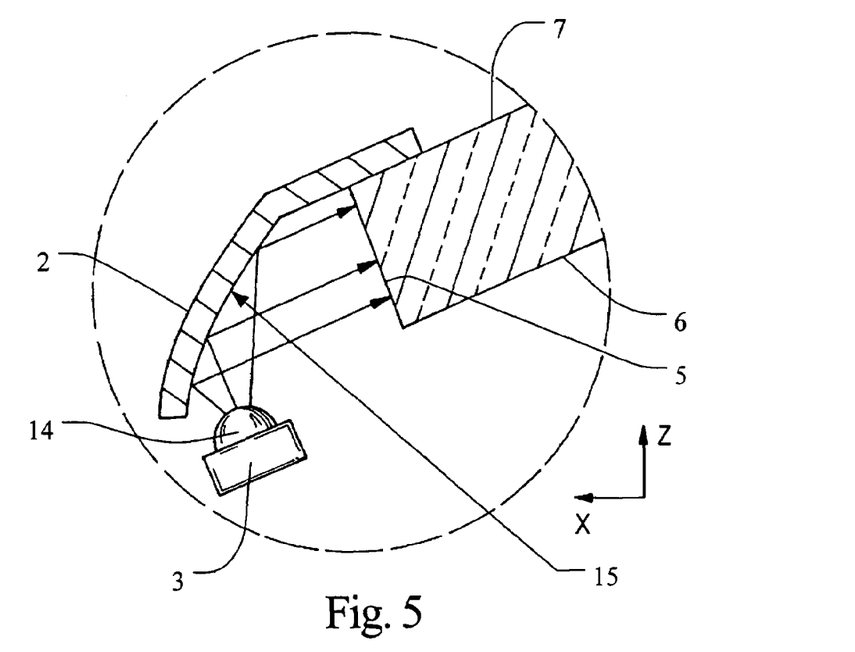
FIG. 5 and FIG. 6 schematically show the coupling of light to the planar light guide via a coupling module.
Figure 6:
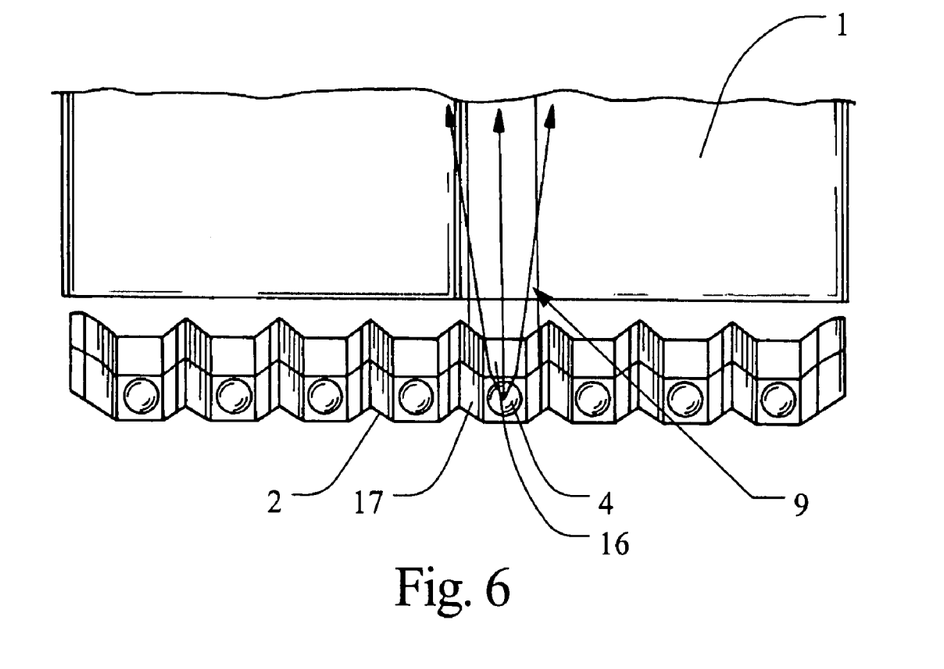

The array of light sources 3 consists of a series of spaced apart LEDs 4. Each LED 4 is preferably located in the focal point 14 of coupling reflectors 2, as seen in FIG. 5. The coupling reflectors 2 are designed to efficiently couple light from light sources 3 to the planar light guide 1. The efficiency of coupled light into the planar light guide 1 and the lit appearance of the planar guide 1 is much better with a coupling reflector 2 as compared with directly coupled light from light sources without a coupling reflector.

The optical surface 15 of the coupling reflectors 2 is Al coated or Al finished, as is known in the art. The optical surface 15 of each coupling reflector 2 is divided into three facets. All facets have a minimal vertical spread, denoted in the z-x cross section of FIG. 5, and a defined horizontal spread, both of which are substantially contained between a plane parallel to the bottom wall 6 and on a plane parallel to the upper wall of the planar light guide 1.

On a central facet 16 of a coupling reflector 2, the light generally has more energy than on the side facets 17 of that coupling reflector 2. This is particularly dependent on the radiation characteristics of the LED 4. Preferably, the radiation characteristic of the LEDs 4 are chosen to illuminate the central facet 16 and side facets 17 as uniformly as soon as possible. This is desirable because the lit appearance of the planar light guide 1 depends on uniform distribution of light energy on the input surface 5 of the planar light guide 1, which is given by the radiation characteristic of LED 4 and the horizontal spread of the facets on the coupling reflector 2. To achieve uniform distribution of light on the input surface 5 of the planar light guide 1, it is preferred that the middle facet 16 have a greater horizontal spread (or width) as compared to the side facets 17 of the coupling reflector 2.

Substantially collimated light from input surface 5 travels through the planar light guide 1 by the principle of TIR on the bottom and upper walls 6 and 7 of the light guide 1. At spaced apart locations on the lower/bottom wall 16, prismatic structures 8, generally in the form of angled steps successively narrowing the thickness of the light guide 1, change the direction of the impacted optical rays 9 in the light guide 1. The optical rays 9 reaching the prismatic structures 8 meet the conditions of TIR. Preferably, the angle of the surface of the prismatic structures 8 relative to the bottom wall 6 is about 45°.

For each prismatic structure 8 on the bottom wall 8 there exists a corresponding element on the upper/top wall 7 of the light guide 1. This coupling element is referred to herein as a decoupling prism element 10. The light reflected from the prismatic structure 8 is directed at and reaches the decoupling prism element 10, whose reflecting surface 11 reflects light in the direction of a planar output surface 12. The reflection of light on the reflecting surface 11 is also the basis of TIR.

Figure 3B:
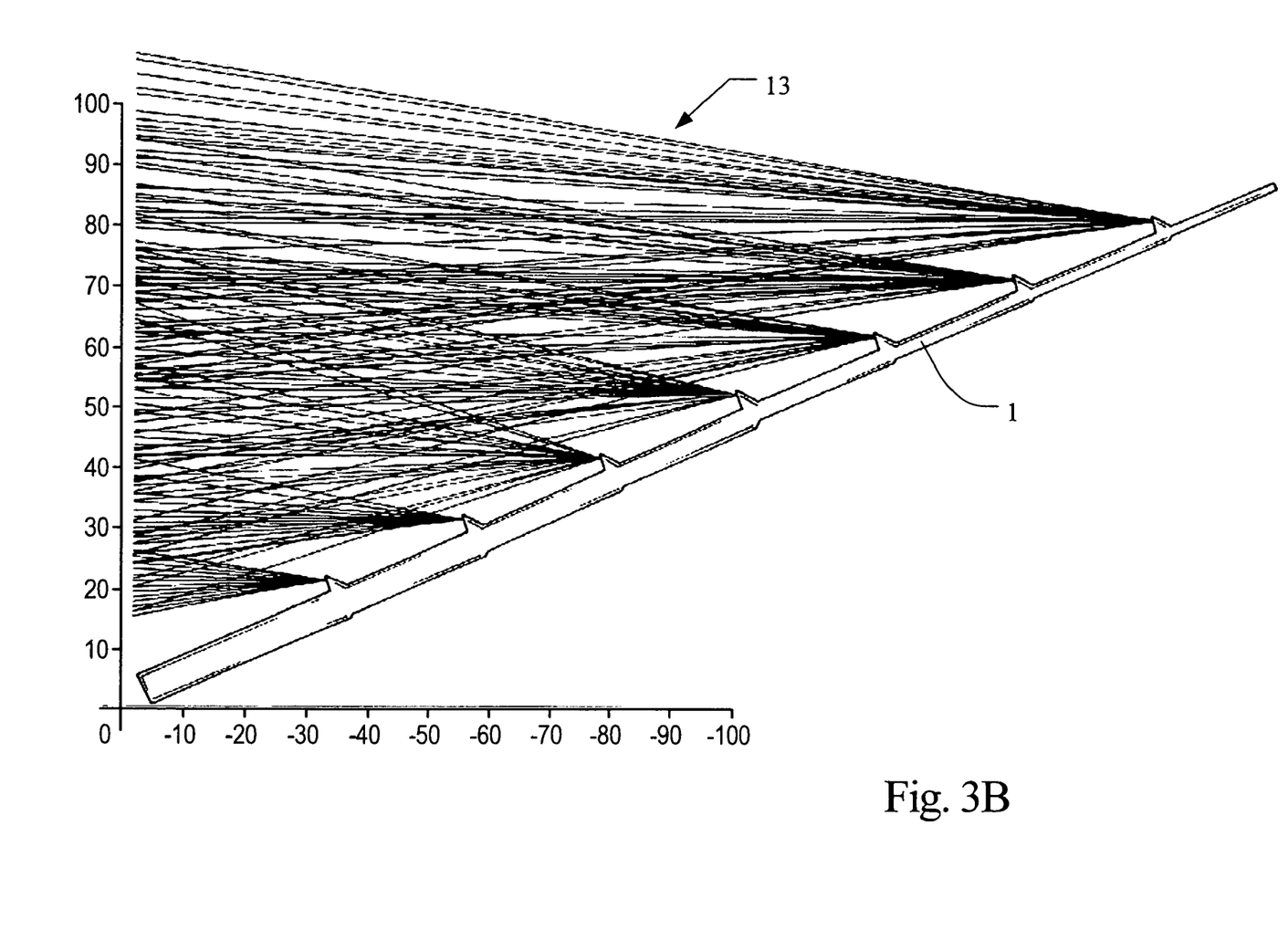
FIG. 3b is a horizontal section of the light guide module seen in FIG. 3a showing rays of decoupled light.
Figure 4:
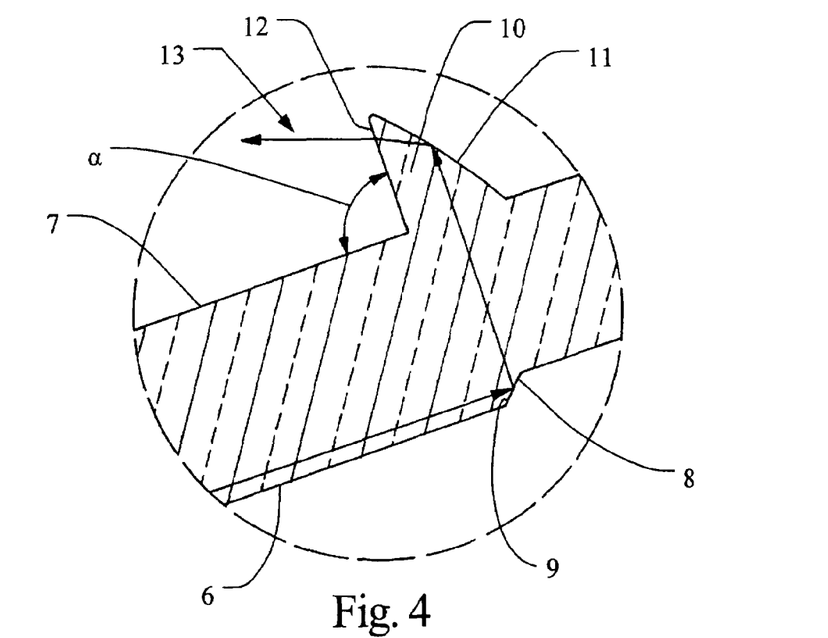
FIG. 4 shows an enlarged schematic view of a decoupling prism element.

The reflecting surface 11 of the decoupling prism element 10 creates the vertical spread of output light from the planar light guide 1, which depends on the radius of the reflecting surface 11. An angle a is defined between the planar output surface 12 of the decoupling prism element 10 and the upper wall 7 of the planar light guide 1. This angle a influences the refraction of decoupled light 13 at the planar output surface 12. As seen in FIG. 4, this angle α is about 90°, but may vary based on the particular application. The direction of the decoupled light 13 from the planar light guide 1 is determined by the decoupling prism element 10, which generally directs the decoupled light 13 in the desired direction, the direction of the longitudinal axis X of the vehicle, as seen in FIGS. 3a and 3b.

The decoupling prism element 10 needs to compensate the inclination of the planar light guide 1 in the lamp, which is the angle β defined between upper wall 7 of the planar light guide 1 and the longitudinal axis X of the vehicle.

Figure 7:
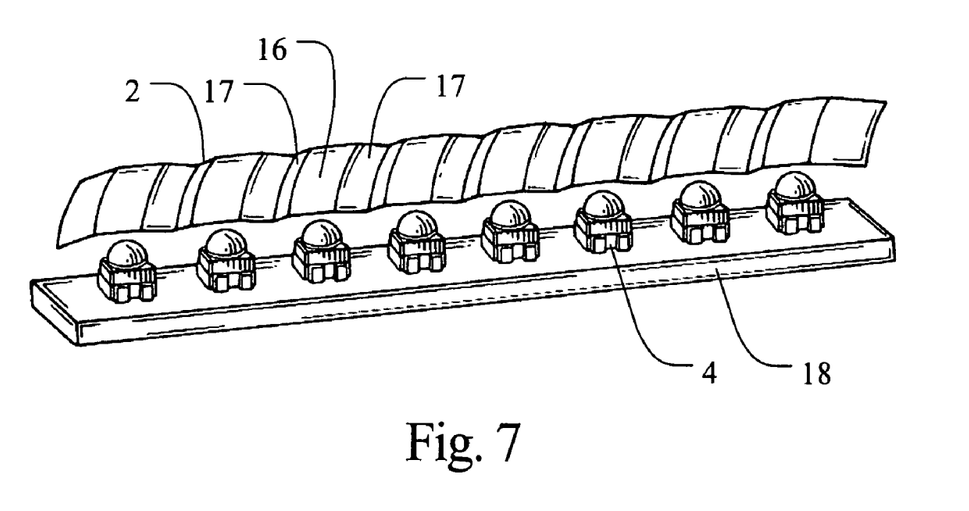
FIG. 7 is a perspective view of a coupling module and LED array.
Figure 8:
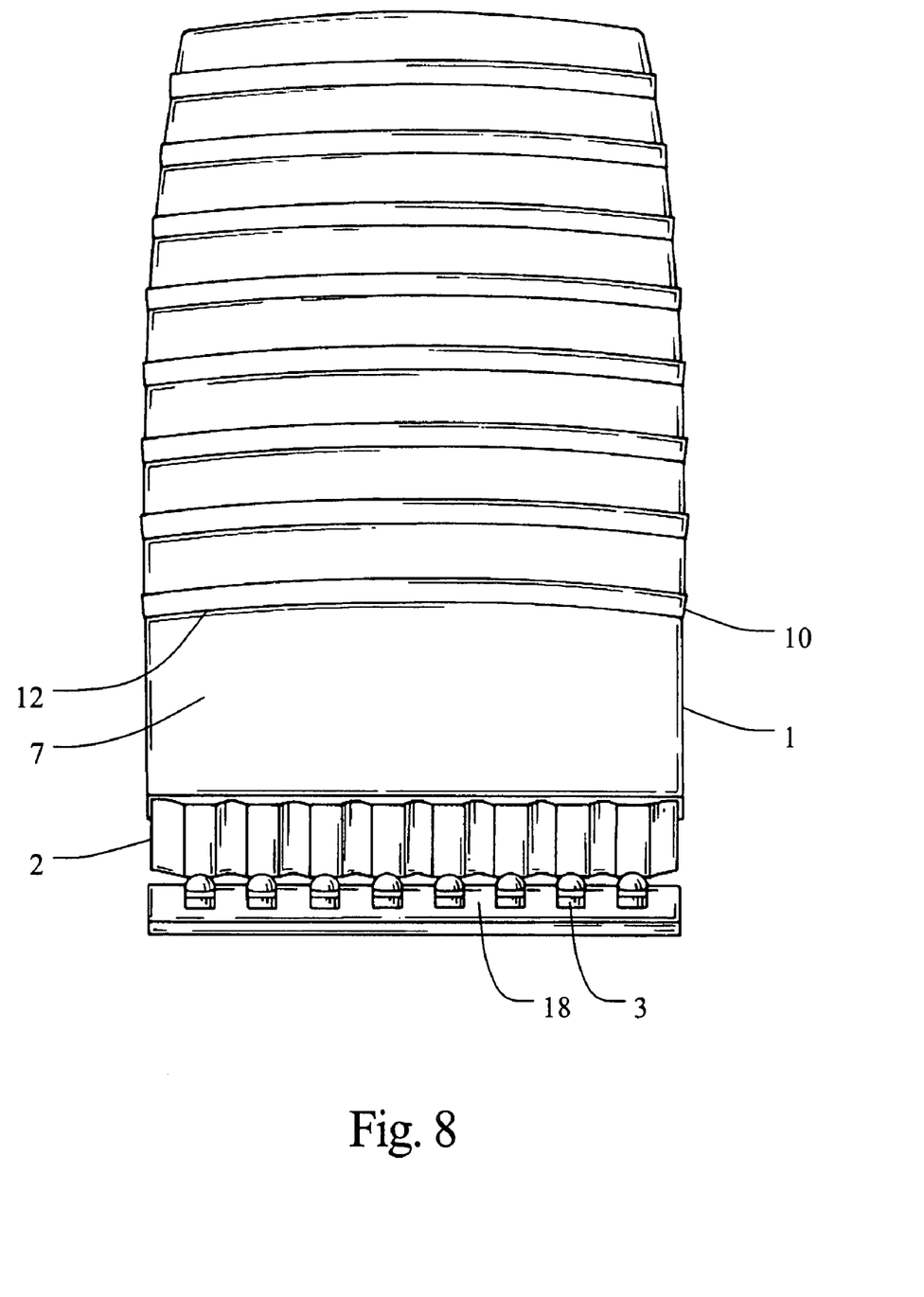
FIG. 8 is a front view of the present variable planar light guide module in one illustrative embodiment of the invention.

As an illustrative and non-limiting example, the variable planar light guide 1 according to the previous description may be applied to automotive vehicles having a rear lamp with high inclination of its exterior surface. As the light sources 3, red LEDs 4 attached to Printed Circuit Board (PCB) 18 (see FIGS. 7 and 8) are used. In such a rear lamp, there may be provided two adjacent planar light guides 1, one for a stop/brake light extending upward and the other for a turn signal light extending downward, or vice versa. Two arrays of reflectors 2, one for each planar light guide 1, with eight reflective chambers and an LED 4 for each small compact reflector 2. Both arrays of reflectors 2 create one module, with both arrays of LEDs 4 being on one PCB board 18 placed in the middle of the rear lamp, between both planar light guides 1. Alternatively, the light sources for such a light guide 1 could include reflectors defining chambers for the brake and turn lights and incandescent bulbs in the chambers.

The invention claimed is:

1. A light guide module for motor vehicles and directing light generally along a horizontal axis, the module comprising:
    an array of light sources;
    an array of reflectors;
    a light guide defining a body having opposed upper and lower walls,
    at least one prismatic structure defined in the lower wall, the prismatic structure having a reflecting surface oriented to reflect light in the light guide based the principle of total internal reflection and to redirect light toward the upper wall,
    at least one decoupling prism element defined in the upper wall, the decoupling prism elements corresponding in number to the at least one prismatic structures, the decoupling prism element being located in a position in the upper wall so as to receive redirected light from a corresponding one of the prismatic structures, the decoupling prism element including a second reflecting surface to reflect light redirected from the first reflecting surface, the second reflecting surface reflecting light toward an output surface based on the principle of total internal reflection and defining a vertical spread of light; and whereby light emitted from the output surface of the decoupling prism element is directed generally along the horizontal axis.

2. The light guide module according to claim 1, wherein each reflector of the array of reflectors has a central facet between a pair of side facets.

3. The light guide module according to claim 1, wherein the central facet defines a first horizontal spread that is greater than a second horizontal spread defined by either of the side facets.

4. The light guide module according to claim 1, wherein as the light sources of the array of light sources are LEDs.

5. The light guide module according to claim 1 wherein the output surface of the decoupling prism element is planar.

6. The light guide module according to claim 1 wherein the upper surface is oriented relative to the horizontal axis at an angle less than 90°.

7. The light guide module according to claim 1 wherein the upper surface is oriented relative to the horizontal axis at an angle less than about 60°.

8. The light guide module according to claim 1 wherein the first reflecting surface is oriented relative to the lower surface at an angle of about 45°.

9. The light guide module according to claim 1 wherein the output surface is oriented relative to the upper surface at an angle of about 90°.

10. The light guide module according to claim 1 wherein the reflectors of the array of reflectors are configured to substantially collimate light from the light sources and to reflect collimated light into the light guide.

11. The light guide module according to claim 1 wherein the body of the light guide is generally planar and defines a width.

12. The light guide module according to claim 11 wherein the prismatic structure and decoupling prism element each extend across the width of the light guide.

13. The light guide module according to claim 1 wherein the light guide is formed of a transparent plastic material.

14. A light guide for motor vehicles comprising:
a transparent body having opposed upper and lower walls,
at least one prismatic structure defined in the lower wall, the prismatic structure having a reflecting surface oriented to reflect light in the light guide based the principle of total internal reflection and to redirect light toward the upper wall,
at least one decoupling prism element defined in the upper wall, the decoupling prism elements corresponding in number to the at least one prismatic structures, the decoupling prism element being located in a position in the upper wall so as to receive redirected light from a corresponding one of the prismatic structures, the decoupling prism element including a second reflecting surface to reflect light redirected from the first reflecting surface, the second reflecting surface reflecting light toward an output surface based on the principle of total internal reflection and defining a vertical spread of light; and whereby light emitted from the output surface of the decoupling prism element is directed generally along an output axis.

15. The light guide according to claim 14 wherein the output surface of the decoupling prism element is planar.

16. The light guide according to claim 14 wherein the upper surface is oriented at an angle less than 90° relative to the output axis.

17. The light guide according to claim 14 wherein the upper surface is oriented relative to the output axis at an angle less than about 60°.

18. The light guide according to claim 14 wherein the first reflecting surface is oriented relative to the lower surface at an angle of about 45°.

19. A light guide for motor vehicles comprising:
a transparent body having opposed upper and lower walls,
at least one prismatic structure defined in the lower wall, the prismatic structure having a reflecting surface oriented to reflect light in the light guide based the principle of total internal reflection and to redirect light toward the upper wall,
at least one decoupling prism element defined in the upper wall, the decoupling prism elements corresponding in number to the at least one prismatic structures, the decoupling prism element being located in a position in the upper wall so as to receive redirected light from a corresponding one of the prismatic structures, the decoupling prism element including a second reflecting surface to reflect light redirected from the first reflecting surface, the second reflecting surface reflecting light toward an output surface based on the principle of total internal reflection and defining a vertical spread of light, the output surface being oriented relative to the upper surface at an angle of about 90°; and
whereby light emitted from the output surface of the decoupling prism element is directed generally along an output axis.

20. The light guide according to claim 14 wherein the body of the light guide is generally planar and defines a width.

21. The light guide according to claim 20 wherein the prismatic structure and decoupling prism element each extend across the width of the light guide.

* * * * *